(12) United States Patent
Fujii et al.

(10) Patent No.: US 7,067,200 B2
(45) Date of Patent: Jun. 27, 2006

(54) JOINED BODIES AND A METHOD OF PRODUCING THE SAME

(75) Inventors: Tomoyuki Fujii, Nagoya (JP); Hideyoshi Tsuruta, Tohkai (JP); Tetsuya Kawajiri, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 291 days.

(21) Appl. No.: 10/623,052

(22) Filed: Jul. 18, 2003

(65) Prior Publication Data

US 2004/0016792 A1   Jan. 29, 2004

(30) Foreign Application Priority Data

Jul. 23, 2002   (JP) .................... P2002-213369

(51) Int. Cl.
*B32B 7/04* (2006.01)
*B32B 7/10* (2006.01)
*B32B 15/04* (2006.01)
*B23K 35/26* (2006.01)
*B23K 101/36* (2006.01)

(52) U.S. Cl. .............. 428/642; 428/601; 428/620; 428/621; 428/646; 228/122.1; 228/123.1; 228/196; 228/235

(58) Field of Classification Search .......... 428/642, 428/646, 673, 620, 621, 601; 228/121.1, 228/121.3, 196, 235.1, 122.1, 123.1
See application file for complete search history.

(56) References Cited

U.S. PATENT DOCUMENTS

| | | | |
|---|---|---|---|
| 6,579,623 B1 * | 6/2003 | Kurihara et al. | 428/556 |
| 6,721,162 B1 * | 4/2004 | Weldon et al. | 361/234 |
| 6,728,091 B1 * | 4/2004 | Tsuruta et al. | 361/234 |
| 6,756,132 B1 * | 6/2004 | Fujii et al. | 428/642 |
| 6,820,795 B1 * | 11/2004 | Fujii | 228/121 |
| 2001/0026010 A1 * | 10/2001 | Horiuchi et al. | |
| 2002/0050246 A1 * | 5/2002 | Parkhe | |
| 2002/0139563 A1 | 10/2002 | Fujii et al. | |
| 2003/0011392 A1 * | 1/2003 | Adams et al. | |
| 2003/0047589 A1 | 3/2003 | Fujii | |
| 2004/0209108 A1 * | 10/2004 | Fujii et al. | |
| 2005/0127619 A1 * | 6/2005 | Tateno et al. | |

FOREIGN PATENT DOCUMENTS

JP          03-003249          1/1991

(Continued)

OTHER PUBLICATIONS

JP 2003-080375 English Machine Translation, Fujii, Manufacturing Method of Semiconductor Wafer Supporting Member Joined Body and Semiconductor Wafer Supporting Member Joined Body, Mar. 2003.*

(Continued)

*Primary Examiner*—John J. Zimmerman
*Assistant Examiner*—Jason L. Savage
(74) *Attorney, Agent, or Firm*—Burr & Brown (57) ABSTRACT

A joined body and method of producing the joined body are provided. A first member containing at least a ceramic and a second member containing at least one of a metal and a metal composite are joined with each other via a metal adhesive. The metal adhesive contains at least indium and at least one material containing at least a component capable of reducing the melting point of indium and is provided between the first and second members to provide a laminate. The laminate is heated at a temperature in a solid-liquid coexisting range of an alloy comprising indium and the indium melting point reducing component to join the first and second members.

15 Claims, 8 Drawing Sheets

FOREIGN PATENT DOCUMENTS

| | | | |
|---|---|---|---|
| JP | 08-008330 | * | 1/1996 |
| JP | 08-277173 | | 10/1996 |
| JP | 10-209255 | | 8/1998 |
| JP | 11-335184 | * | 12/1999 |
| JP | 2002-293655 | * | 10/2002 |
| JP | 2003-080375 | * | 3/2003 |

OTHER PUBLICATIONS

JP 08-008330 English Machine Translation, Miyata Giken YG, Jan. 1996.*

U.S. Appl. No. 10/374,818, filed Feb. 25, 2003, Fujii.

* cited by examiner

JOINED BODIES AND A METHOD OF PRODUCING THE SAME

This application claims the benefit of Japanese Patent Application P2002-213369, filed on Jul. 23, 2002, the entirety of which is incorporated by reference.

BACKGROUND OF THE INVENTION

1. Field of the Invention

The invention relates to a method of joining a first member comprising at least a ceramic and a second member comprising a metal or a metal composite, and a joined body thereof.

2. Related Art Statement

In semiconductor processing systems, such as CVD, sputtering and etching, a semiconductor wafer is mounted on a susceptor. The wafer is then processed by generating plasma in a process chamber, or by heating a reaction gas so that the gas is dissociated. It has been known to use a ceramic electrostatic chuck as a susceptor and to adsorb the wafer onto the susceptor while the wafer is processed. It has been also known to use a ceramic heater as a susceptor and to mount the wafer on the heater, which is directly heated. It is necessary to reduce the temperature change during the processing of the wafer on the susceptor, for improving the productivity of the wafer. For this, it is necessary to cool the wafer to compensate for the incidence of heat due to plasma generation so that the temperature of the wafer is controlled. A cooling system is thus connected with the susceptor.

A technique for joining an electrostatic chuck with a cooling board of water cooling system by means of metal flange has been proposed (Japanese patent laid-open publication 3-3249A). According to the technique, an electrostatic chuck made of alumina is bonded with a cooling flange made of aluminum with indium. According to Japanese patent publication 4-287344A, a susceptor and a metal cooling board are joined with each other by means of a paste-like silicone resin.

When indium or silicone resin adhesive compositions are used as an adhesive for joining a ceramic electrostatic chuck and a water cooling flange made of metal, however, insufficient pressure during the joining process may deteriorate the flatness of the semiconductor wafer adsorption face of the chuck. The wafer is adsorbed onto the adsorption face of the chuck during the processing of the wafer. If the flatness of the adsorption face is deteriorated, the chuck may be out of specification so that the production yield is reduced. Moreover, when a back side gas is supplied between the back face of the semiconductor wafer and the chuck, there would be a risk that the gas might leak along the joining interface of the chuck and cooling flange. In particular, thermal cycles are applied in a system for producing semiconductors, and it is demanded to secure the air-tightness along the joining interface between the chuck and flange with excellent reliability. It is thus preferred to apply a pressure during the joining process. On the other hand, when the pressure during the joining process is too large, adhesive may leak outside the joining interface of the chuck and cooling flange. Further, the thickness of the adhesive may not be uniform or may be changed among articles actually produced.

For the above reasons, it is demanded to improve the air-tightness of the joining interface, to prevent adhesive leakage and to improve the adhesion along the interface of the adhesive layer and chuck when the chuck and metal member are joined. Particularly, it is difficult to adequately wet a ceramics with an adhesive, so that it is difficult to improve the adhesiveness along the interface microscopically.

SUMMARY OF THE INVENTION

An object of the present invention is to provide a process for joining a first member containing at least a ceramic and a second member containing at least a metal or a metal composite, so that the air-tightness of the joining portion may be improved, adhesive leakage is prevented and adhesion along the interface of the adhesive layer and the ceramic may be improved.

The present invention provides a method of producing a joined body of a first member containing at least a ceramic and a second member containing at least one of a metal and a metal composite. The method includes the steps of.

providing an adhesive composed of a metal containing at least indium and a material for reducing melting point containing at least a component capable of reducing the melting point of indium between the first and second members to provide a laminate; and heating the laminate at a temperature in a solid-liquid coexisting range of an alloy comprising indium and the component to join the first and second members.

The present invention further provides a joined body produced by the above method.

The present invention further provides a joined body comprising a first member containing at least a ceramic, a second member containing at least one of a metal and a metal composite and a joining layer provided between the first and second members. The joining layer has a phase of an alloy containing indium and a component capable of reducing the melting point of indium.

The present inventor has reached the following process. That is, a joining material composed of a metal containing at least indium and a material containing at least a component capable of reducing the melting point of indium is provided between the first and second members to provide a laminate. The laminate is then heated at a temperature in a solid-liquid coexisting range of an alloy comprising indium and the component to join the first and second members.

When indium is heated to a temperature higher than the melting point of indium and becomes molten, leakage of the molten indium may easily occur. Contrary to this, such leakage may be effectively prevented according to the present invention, even when a substantially high pressure is applied. The reason is as follows. When the adhesive is heated to a temperature higher than the melting point, the whole of the adhesive is inevitably uniformly molten. The adhesive thus flows and may easily leak from the interface between the first and second members when a high pressure is applied on the adhesive. Contrary to this, according to the present invention, the indium and the alloy-forming component are not uniformly molten. It is considered that the melting process starts from the interface of indium and the alloy-forming component, and the molten region is diffused and enlarged slowly from the starting point. Most of the adhesive is of a solid phase and is not easily deformed when pressure is applied during the heating process.

In addition to this, according to this joining method, it has proved to be possible to maintain the air-tightness of the joining portion and to considerably improve the adhesion along the interface between the adhesive layer and ceramics.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 2 (a) is a drawing schematically showing a supporting member 10 for a semiconductor wafer, a metal member 12, a foil 2 made of a metal adhesive and materials for reducing melting point of indium interposed between the members 10 and 12.

FIG. 2 (b) schematically shows an assembly 13 vacuum packaged with a packaging film 3.

FIG. 4 (a) is a drawing schematically showing a supporting member 10 for a semiconductor wafer, a metal member 12, a foil 2 made of a metal adhesive and a material 1A for reducing melting point of indium interposed between the members 10 and 12.

FIG. 4 (b) schematically shows an assembly 13 vacuum packaged with a packaging film 3.

FIG. 6 (a) schematically shows a joined article 15A.

FIG. 6 (b) schematically shows a joined article 15B.

FIG. 8 (a) is a cross-sectional view schematically showing a joined article 15D.

FIG. 8 (b) is a cross-sectional view taken along a line VIII—VIII of FIG. 8(a).

DETAILED DESCRIPTION OF THE INVENTION

The present invention will be described further, referring to the attached drawings.

Figure 1:
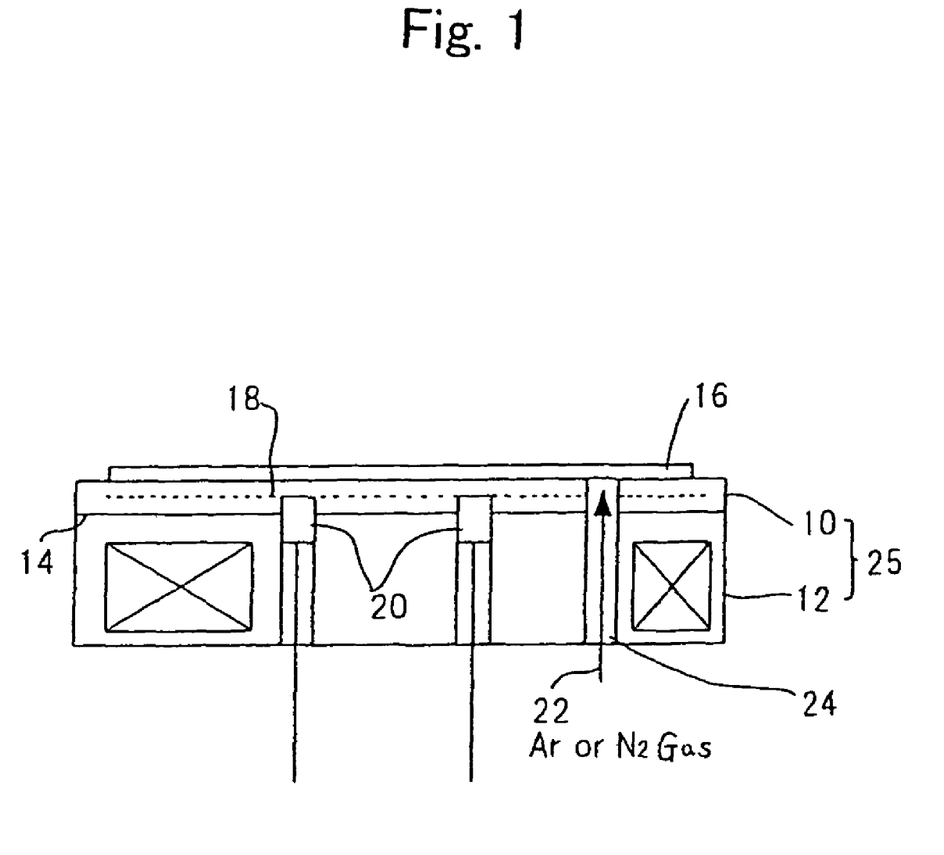
FIG. 1 is a drawing schematically showing a joined article 25 according to one embodiment of the present invention.

FIG. 1 is a drawing schematically showing a joined article 25 according to one embodiment of the invention. The joined article 25 is composed of an electrostatic chuck 10, a cooling flange 12 and a joining layer 14. The chuck 10 has an electrode 18 for electrostatic chuck embedded therein. A terminal 20 is connected with the electrode 18. The electrostatic chuck 10 has an adsorption face for supporting and adsorbing a semiconductor wafer 16. In the example, a through hole 24 is provided through the cooling flange 12 and chuck 10. A back side gas, such as argon gas or nitrogen gas, may be supplied through the through hole 24 as an arrow 22. Further, through holes (not shown) may be provided in the cooling flange 12 and chuck 10 for inserting lift pins for lifting the semiconductor wafer from the adsorption face.

Figure 2:
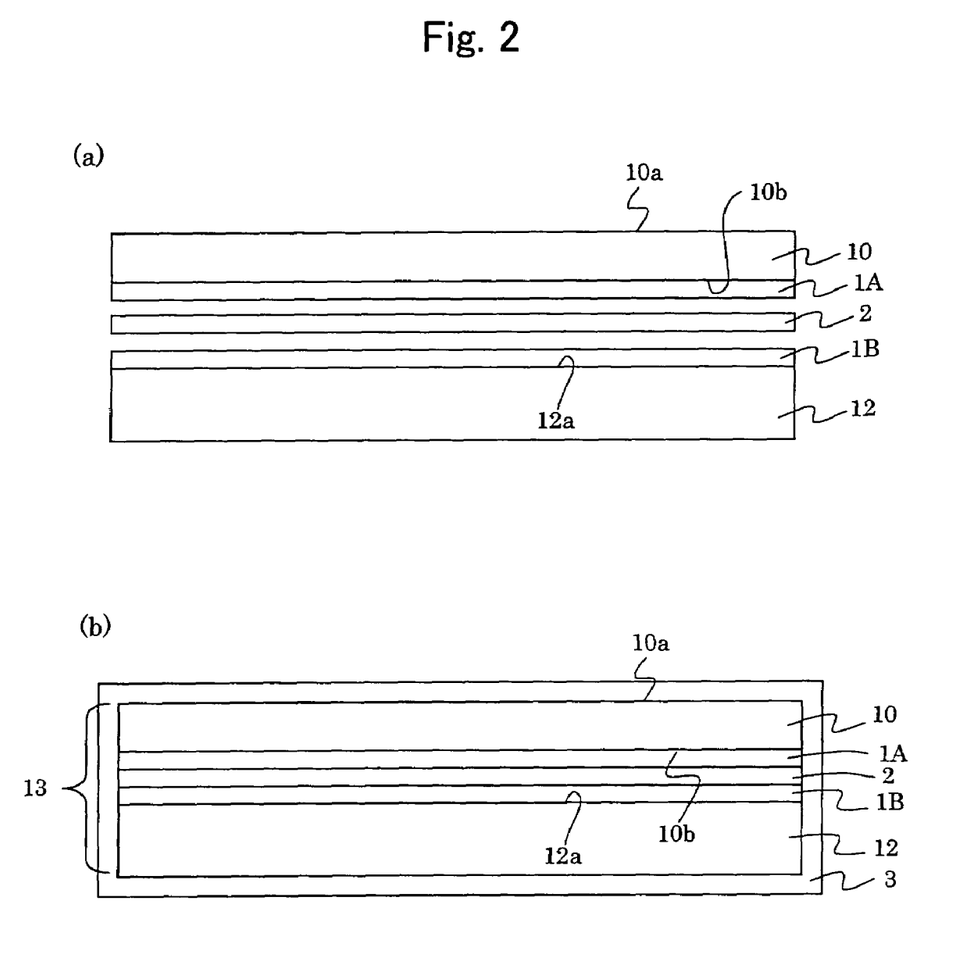
Figure 3:
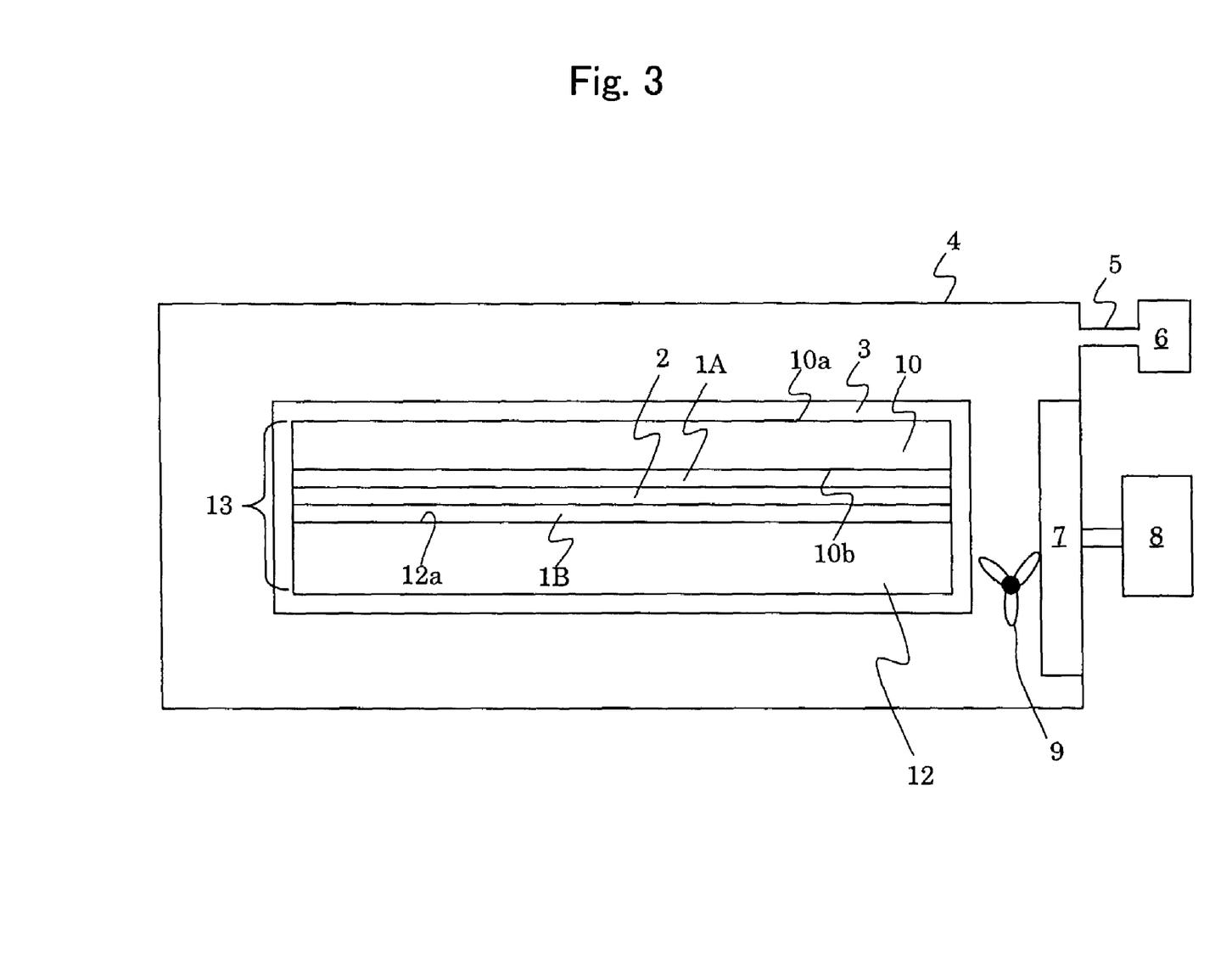
FIG. 3 is a diagram schematically showing the vacuum packaged assembly 13 contained in an autoclave 4.

A process for producing a joined article 25 such as that shown in FIG. 1 will be described, referring to FIGS. 2 and 3. In FIGS. 2 and 3, the detailed structure of the electrostatic chuck and cooling flange shown in FIG. 1 are omitted for the purpose of providing a general explanation of the process according to the invention.

The first member 10 and second member 12 are joined with each other as shown in FIGS. 2(a), 2(b) and 3. The first member 10 contains at least a ceramic. The entire first member 10 may be made of ceramics. Alternatively, the first member 10 has a main body having a joining face 10b to be joined and a ceramic covering the joining face 10b. In the latter case, the main body of the first member may be made of a metal, a metal composite or ceramic composite.

The first member may be made of a ceramic material including an oxide ceramic such as alumina, calcium titanate, barium titanate and nitride ceramics. Silicon nitride and sialon are preferred among nitride ceramics for further improving the resistance of the first member against thermal stress. Aluminum nitride is preferred for improving the anti-corrosion property against a fluorine-based corrosive gas and the thermal conductivity of the first member.

The first member may be used in a system for producing semiconductors, and may preferably be a susceptor for mounting semiconductors. Such susceptors may have many and various functions as long as they may work as a susceptor for setting a semiconductor wafer. For example, when an electrode for electrostatic chuck is provided inside the substrate of the member, such a member may be used as an electrostatic chuck system. Alternatively, when a resistance heating element is provided inside the substrate, the supporting member may be used as a ceramic heater. Further, when an electrode for generating plasma is provided inside the substrate, the supporting member may be used as an electrode device for generating plasma. In a particularly preferred embodiment, the supporting member is an electrostatic chuck.

The second member 12 contains at least a metal or a metal composite. The entire second member 12 may be made of a metal or a metal composite. Alternatively, the second member 12 has a main body having a joining face 12a and a metal or metal composite film covering the joining face 12a. In the latter case, the main body of the second member may be made of a ceramic or a ceramic composite.

The metal of the second member is not particularly limited. The metal may be aluminum, copper, stainless steel, nickel or alloys thereof, when the second member is to be exposed to a halogen based corrosive gas.

The metal composite of the second member is not particularly limited. The metal composite may be composed of a metal component including an aluminum alloy or a copper alloy and a ceramic component including. SiC, AlN or alumina.

The application or function of the second member is not particularly limited. In a preferred embodiment, the second member is a cooling system having a cooling mechanism. A refrigerant used for the cooling mechanism may be a liquid such as water and silicone oil and a gas such as air and an inert gas.

As shown in FIGS. 2(a) and (b), an adhesive 2 and materials 1A and 1B are provided between the first member 10 and second member 12 to provide a laminate 13, according to the present invention. The adhesive 2 is made of a metal containing at least indium. The materials 1A and 1B contain at least a component capable of reducing the melting point of indium. The laminate 13 is then heated at a temperature in a solid-liquid phase coexisting temperature of the alloy of indium and the indium melting point reducing component.

The metal adhesive 2 is pure indium metal or an alloy of indium. The pure indium metal may contain inevitable impurities. The alloy of indium may contain gold, silver, tin, lead, titanium, magnesium or alloys thereof. The amount of metal or metals other than indium in the alloy is preferably not larger than 10 weight percent.

The shape of the adhesive is not particularly limited. According to the present invention, however, the melting process takes place from the interface of the adhesive 2 and material 1A or 1B at a temperature that is lower than the melting point of indium. After the melting process, a joining layer containing an indium alloy is generated between the first member 10 and second member 12. For facilitating the reaction generating the alloy, the thickness of the adhesive 2 is preferably not larger than 500 microns, and more preferably, not larger than 300 microns. From a similar viewpoint, the adhesive 2 is preferably a metal foil.

When the thickness of the adhesive 2 is too thin, the state of the adhesive may be deviated. For further improving the air-tightness of the joining interface, the thickness of the adhesive 2 is preferably not smaller than 20 microns.

The shape of the materials 1A or 1B for reducing the melting point of indium is not particularly limited. For improving the reaction of indium and the component to uniformly generate the alloy over the entire adhesive, the material preferably has a foil or film shape.

When the thickness of the material for reducing the indium melting point is too large, the reaction of the material and indium might be insufficient. From this viewpoint, the thickness of the material for reducing the indium melting point is preferably not larger than 50 microns, and more preferably, not larger than 30 microns. On the other hand, when the material for reducing the melting point of indium is too thin, the state of the adhesive layer may be deviated. For further improving the air-tightness of the joining interface, the thickness of the material for reducing the melting point of indium is preferably not smaller than 1 micrometer and more preferably, not smaller than 3 microns.

The material for reducing the melting point of indium is provided between the adhesive 2 and first member 10, and/or between the adhesive 2 and second member 12. In a preferred embodiment, the material for reducing the melting point of indium is provided at least between the adhesive 2 and first member 10. It is effective to provide the material on the side of the first member 10 for wetting the surface of the ceramic (first member) 10 having a low wettability with the adhesive.

According to the present invention, the adhesive composed of a metal containing at least indium and the material containing at least a component capable of reducing the melting point of indium is provided between the first and second members to provide a laminate. The laminate is then heated at a temperature in a solid-liquid coexisting range of an alloy comprising indium and the component. The alloy is mainly composed of indium and the indium melting point reducing component. The solid-liquid phase coexisting temperature means a solid-liquid phase coexisting temperature corresponding with the composition of the alloy. The solid-liquid coexisting temperature changes depending on the composition of the indium alloy and may be determined from a phase diagram.

The indium melting point reducing component of the alloy is not particularly limited, as long as the component functions to reduce the melting point of indium. The component is preferably a metal selected from the group consisting of tin, silver and alloys thereof. More preferably, the component is pure tin, or an alloy of tin and silver, lead, titanium or magnesium. Inevitable impurities may be contained in pure tin. The tin alloy preferably contains 3 weight percent or less of a metal component other than tin.

The heat treatment is preferably performed at a temperature not lower than 90° C. and not higher than 155° C. It is possible to further reduce the air-tightness of the joining interface by the heat treatment at a temperature not lower than 90° C. From this viewpoint, the temperature is preferably not lower than 95° C. and more preferably, not lower than 100° C.

When the indium melting point reducing component is tin or an alloy of tin, the temperature for the heat treatment is preferably not lower than 120° C. so as to allow the melting process of the adhesive and material for reducing the melting point to proceed.

In a preferred embodiment, the laminate is heated while the laminate is subjected to isostatic pressurizing. It is thus possible to maintain the air-tightness of the joining interface and to prevent the deterioration of the flatness of the supporting face of a semiconductor mounting member after the joining process.

Further, for example in an electrostatic chuck, it is necessary to provide various holes such as a hole for supplying a gas, holes for lift pins, and holes for inserting terminals. In this case, it is necessary to provide a hole in a cooling flange communicating with each of the above holes formed in the chuck. When holes provided in the first and second members, respectively communicate with each other, it is indispensable to further improve the air-tightness along the joining interface of the first and second members. It is also necessary to prevent the adhesive flow into the holes and the extrusion of the adhesive.

In the above embodiment, a first hole is provided in the first member, a second hole is provided in the second member, and both holes are in communication with each other. In this embodiment, it is preferred to provide an air-tight sealing member between the first and second holes and the adhesive so that the air-tight sealing member directly contacts the first and second members for sealing, when the first and second members are laminated. The holes are thereby sealed with the air-tight sealing member and further sealed with the joining layer according to the present invention, so that the air-tightness may be further improved. At the same time, it is possible to prevent the extrusion of the adhesive into the holes. As a result, when mass production is to be performed, it is possible to improve the production yield of products having desired air-tightness.

The kind or material of the air-tight sealing member is not particularly limited. It is preferred to apply a sealing member capable of exhibiting excellent air-tightness when a pressure is applied from the first and second members, such as an O-ring or a gasket. A rubber O-ring commonly used for a vacuum system may be applied. Preferably, the O-ring made of a material for reducing particle generation used for a semiconductor production system.

Preferred embodiments will be described further in detail below. As shown is FIG. 2(*a*), a material 1A for reducing the indium melting point is provided on a joining face 10*b* of a first member 10, and a material 1B for reducing the indium melting point is provided on a joining face 12*a* of a second member 12. The materials 1A and 1B are foils or films. Such films may be formed by any processes including ion plating, chemical vapor deposition, physical vapor deposition, organic metal chemical vapor deposition, vapor deposition, sputtering and plating methods.

The thus obtained assembly 13 is heated while it is subjected to isostatic pressing. The actual methods applied for performing the heating and isostatic pressing of the assembly 13 are not particularly limited. Preferably, as shown in FIG. 2(*b*), the assembly 13 is vacuum packaged in a packaging film 3 and then contained in a sealed container filled with an inert gas. The vacuum packaged assembly is subjected to isostatic pressing with the inert gas in the sealed container. Alternatively, the assembly may be subjected to isostatic pressing with a liquid.

The material of the film 3 is not particularly limited, as long as it has elasticity and thermal resistance at a temperature applied for heating the assembly. The inert gas may be nitrogen, argon or a mixed gas of nitrogen and argon. The pressure of the inert gas in the sealed container is not limited as long as it is effective for producing a joined article having a sufficiently high air-tightness. The pressure of the gas is preferably not lower than 5 atm for further improving the air-tightness of the joined article. The upper limit of the gas pressure is not particularly set on the viewpoint of the invention. The pressure is preferably not higher than 100 atm and more preferably, not higher than 20 atm from the practical point of view. The heating temperature was described above.

The sealed container is not particularly limited and is preferably an autoclave.

In a preferred embodiment, as shown in FIG. 3, a vacuum packaged assembly 13 is contained in an autoclave 4, and then heated and pressed. A gas source 6 is connected through a gas passage 5 in the autoclave 4. A heater 7 is also contained in the autoclave 4 and the calorific power of the heater is controlled with a power controller 8. A fan 9 is provided in the front of the heater 7 for reducing the temperature deviation in the autoclave.

Figure 4:
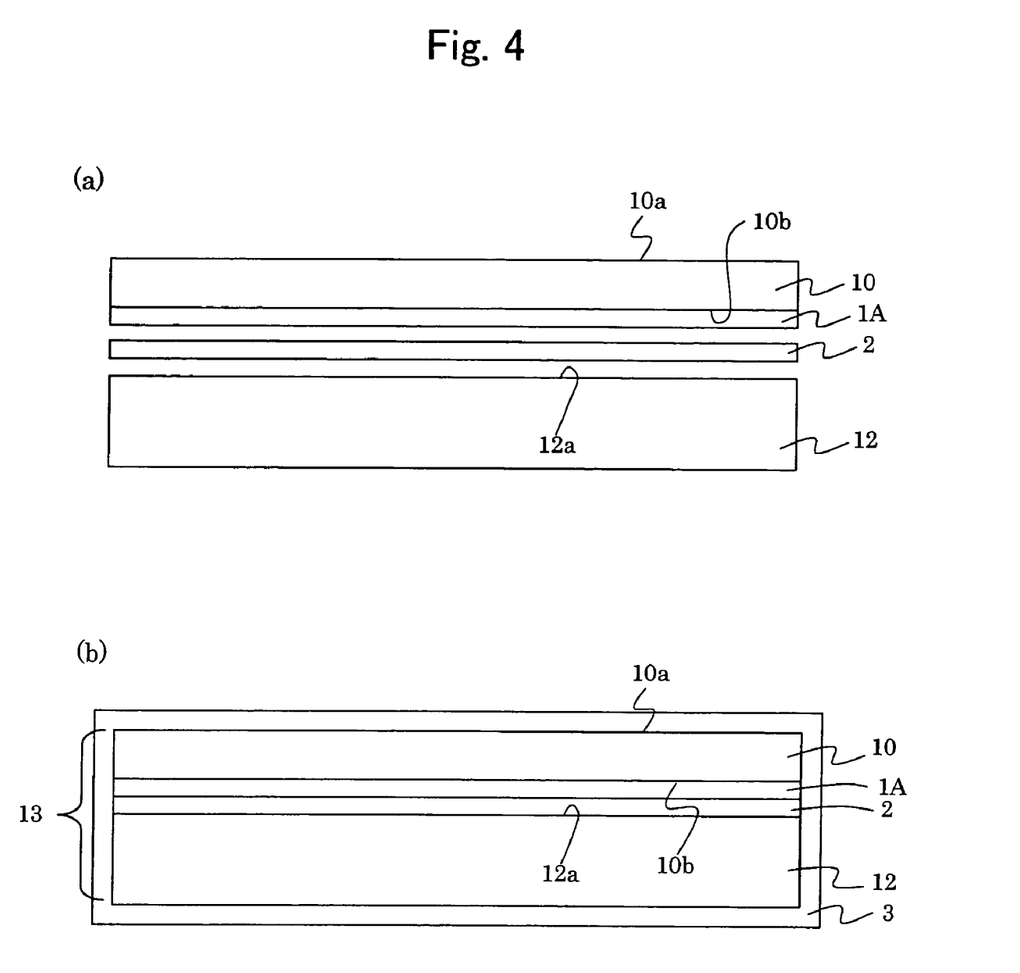

The material for reducing the indium melting point does not need to be provided on the both sides of the adhesive as described above. For example, as shown in FIGS. 4(a) and 4(b), the material 1A may be provided between the adhesive 2 and first member 10.

Figure 5:
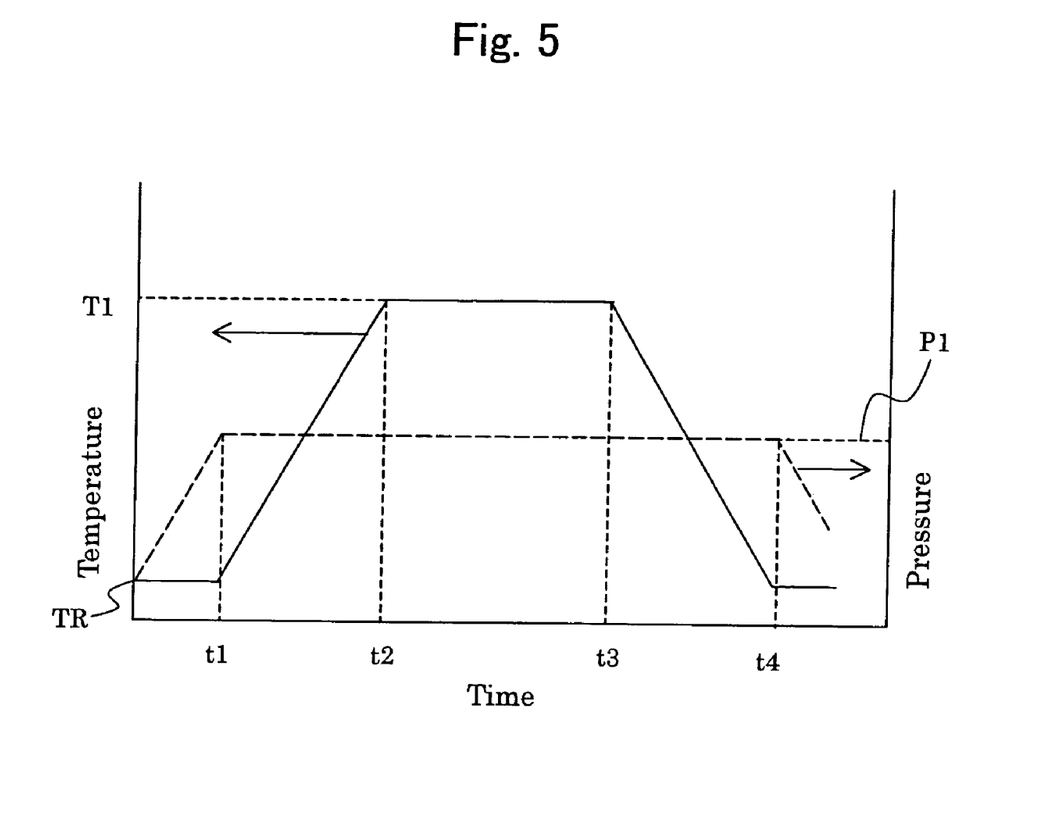
FIG. 5 is a graph schematically showing an example of a schedule of temperature and pressure during the joining process of the invention.

In a preferred embodiment, the assembly is subjected to isostatic pressing while heating the assembly at the maximum temperature. That is, as shown in FIG. 5, the pressure is adjusted at a specified value "P1" during the maximum temperature "T1" (from the time points "t2" to "t3").

In a preferred embodiment, the isostatic pressing is continued during the temperature reduction period after "t3" (the end of maximum temperature period). In a particularly preferred embodiment, the isostatic pressing is continued to "t4" (the end of the temperature reduction period to room temperature T4). It is found that the continued isostatic pressing may be effective for further improving the flatness of the supporting face of the supporting member after the joining process.

In the joined article of the present invention, the flatness of the supporting face of the supporting member is preferably not larger than 30 μm and more preferably, not larger than 10 μm.

A joined body 15A is thus obtained as schematically shown in FIG. 6(a). The joined body 15A has a first member 10, second member 12 and a joining layer 14 joining the members. The joining layer 14 has an inhomogeneous microstructure containing an indium alloy phase. A through hole 21 is provided in the joined body 15B shown in FIG. 6(b).

EXAMPLES (Experiment A)

Figure 6:
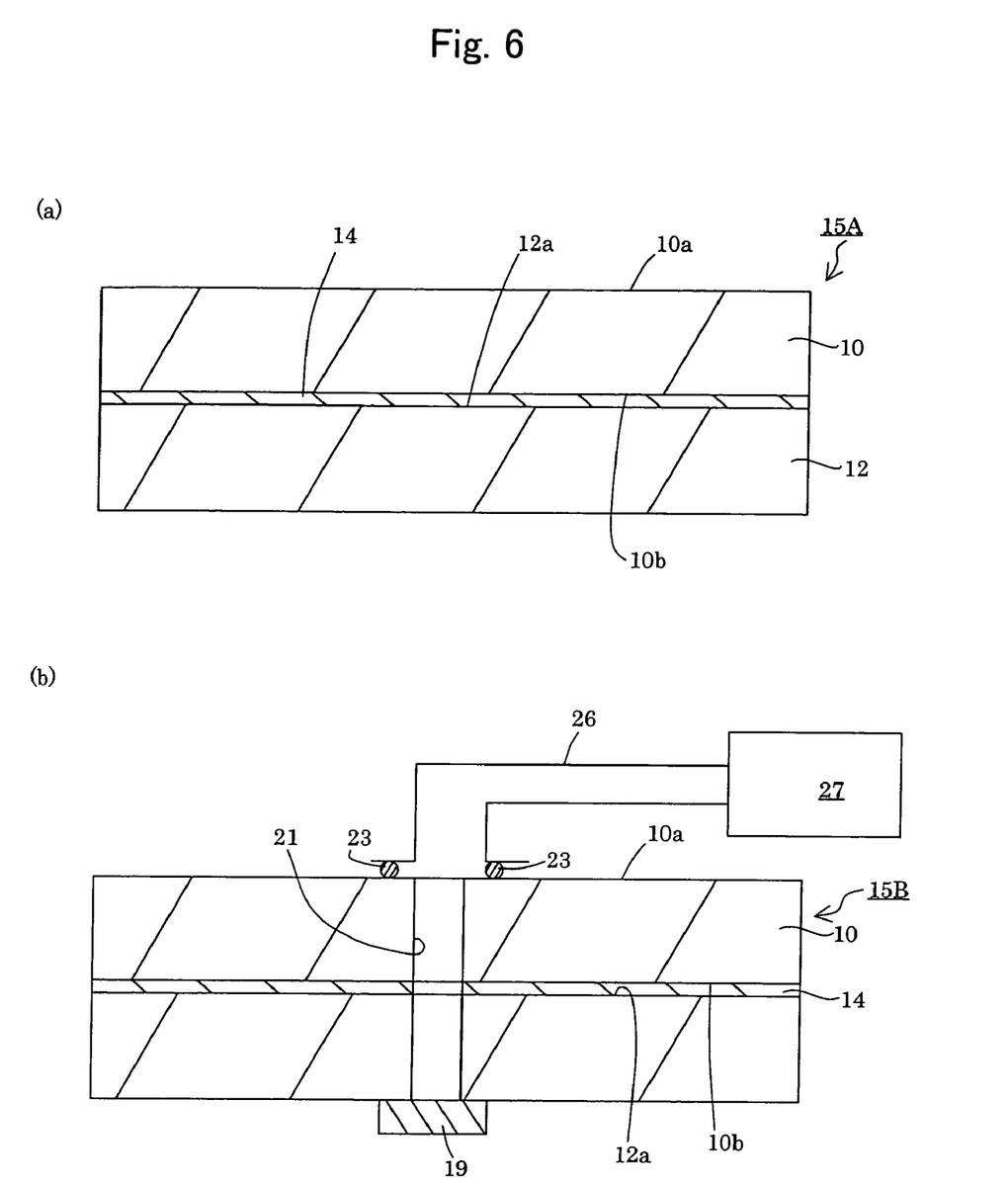

A joined article 15B shown in FIG. 6 (b) was produced. Specifically, the first member 10 and second member 12 were prepared, as shown in FIG. 2(a). The first member 10 had a shape of a rectangular parallelopiped with a length of 50 mm, a width of 50 mm and a thickness of 10 mm and made of aluminum nitride. The second member 12 had a shape of a rectangular parallelopiped with a length of 50 mm, a width of 50 mm and a thickness of 10 mm and made of aluminum A 6061 alloy. Five through holes each having a diameter of 3 mm was provided in each of the members.

An indium foil 2 and foils 1A and 1B of materials for reducing the melting point of indium were provided between the first member 10 and second member 12 (Experimental numbers A2, 3, 5, 6, 8 and 9). Alternatively, films of the material for reducing melting point of indium were formed on both faces 10b and 12a by sputtering process (A1, 4). The indium foil 2 was made of pure indium having a purity of 99.9 percent. The foil had a length of 50 mm, width of 50 mm and a thickness of 0.2 mm (deviation of ±10 percent). The material and thickness of the material for reducing melting point were changed as shown in Table 1.

The assembly was then vacuum packaged and contained in an autoclave 4 maintained in a vaccum state. The assembly was then subjected to heating and isostatic pressing according to the schedule shown in FIG. 5. That is, the inner pressure was elevated to 14 atm "t1", and the temperature was then elevated from room temperature to heating temperatures shown in table 1. A pressure of 14 atm was then maintained for 5 hours. The temperature was then reduced to room temperature while the pressure was maintained at 14 atm. The pressure was finally reduced to 1 atm and the resultant joined article 15B was removed from the autoclave.

In the thus obtained joined article 15B, one end of the through hole 21 was sealed with a rubber plate 19, and the other end of the through hole was connected to a tube 26 of a system for detecting helium gas leakage using an O-ring 23, as shown in FIG. 6 (b). Helium gas was supplied to the outside of the joined article 15B to measure the gas leakage. When the leakage amount of helium gas was lower than $1 \times 10^{-8}$ Pa·m$^3$/s, the test result was indicated as "OK" in Table 1. When the leakage amount of helium gas was higher than $1 \times 10^{-8}$ Pa·m$^3$/s, the test result was indicated as "NG" in Table 1.

Further, an ultrasonic defect detection test was performed from the side of the surface 10a of the joined article 15B. An echo from the joining interface of the AlN and joining layer 14 was developed to obtain an image and was evaluated. In the image, whitish regions correspond to defects, and blackish regions indicate excellent adhesion. The combination of the whitish and blackish regions indicates inhomogeneous adhesion.

TABLE 1

| Experiment | Material For Reducing Melting Point | Thickness (μm) | Joining condition Temperature (°C.) | Pressure (atm) | Results Sealing Property | Ultrasonic Detection |
|---|---|---|---|---|---|---|
| A1 | Sn Sputtering | 3 | 135 | 14 | OK | Excellent Uniform |

TABLE 1-continued

| Experiment | Material For Reducing Melting Point | Thickness (μm) | Joining condition Temperature (° C.) | Pressure (atm) | Results Sealing Property | Ultrasonic Detection |
|---|---|---|---|---|---|---|
| A2 | Sn Foil | 15 | 135 | 14 | OK | Adhesion Excellent Uniform |
| A3 | Sn Foil | 30 | 135 | 14 | OK | Adhesion Excellent Uniform |
| A4 | Ag Sputtering | 3 | 135 | 14 | OK | Adhesion Excellent Uniform |
| A5 | Ag Foil | 10 | 135 | 14 | OK | Adhesion Excellent Uniform |
| A6 | Ag Foil | 30 | 135 | 14 | OK | Adhesion Excellent Uniform |
| A7 | None | — | 153 | 14 | OK | Adhesion Poor Adhesion Irregularities |
| A8 | Sn foil | 15 | 160 | 14 | NG | — |
| A9 | Sn foil | 15 | 160 | 14 | Not Joined | — |

In experimental sample numbers A1 to A6, a material composed of silver and tin was used, and heat treatment was performed at 135° C. in a range of a solid-liquid coexisting temperature of the indium-silver alloy or the indium-tin alloy. As a result, the amount of helium leakage was low. The joining interface between the joining layer and first member exhibited excellent contact and adhesion, judging from the results of the ultrasonic defect detection test.

On the contrary, in experimental sample number A7, only the indium foil was used and heated at 153° C. As a result, although the amount of helium gas leakage proved to be low, many whitish regions and irregularities were observed along the joining interface of the joining layer and first member, based on the results of the ultrasonic defect detection test. In experimental sample number A8, a tin foil was used and heated at 160° C., which is higher than the melting point of the indium-tin alloy and not within the liquid-solid coexisting temperature range. As a result, indium leaked out of the interface between the first and second members, leading to sealing defects. In experimental sample number A9, a tin foil was used and heated at 100° C. 100° C. was not within the liquid-solid coexisting temperature range of an indium-tin alloy. As a result, the first and second members were not joined.

(Experiment B)

Figure 7:
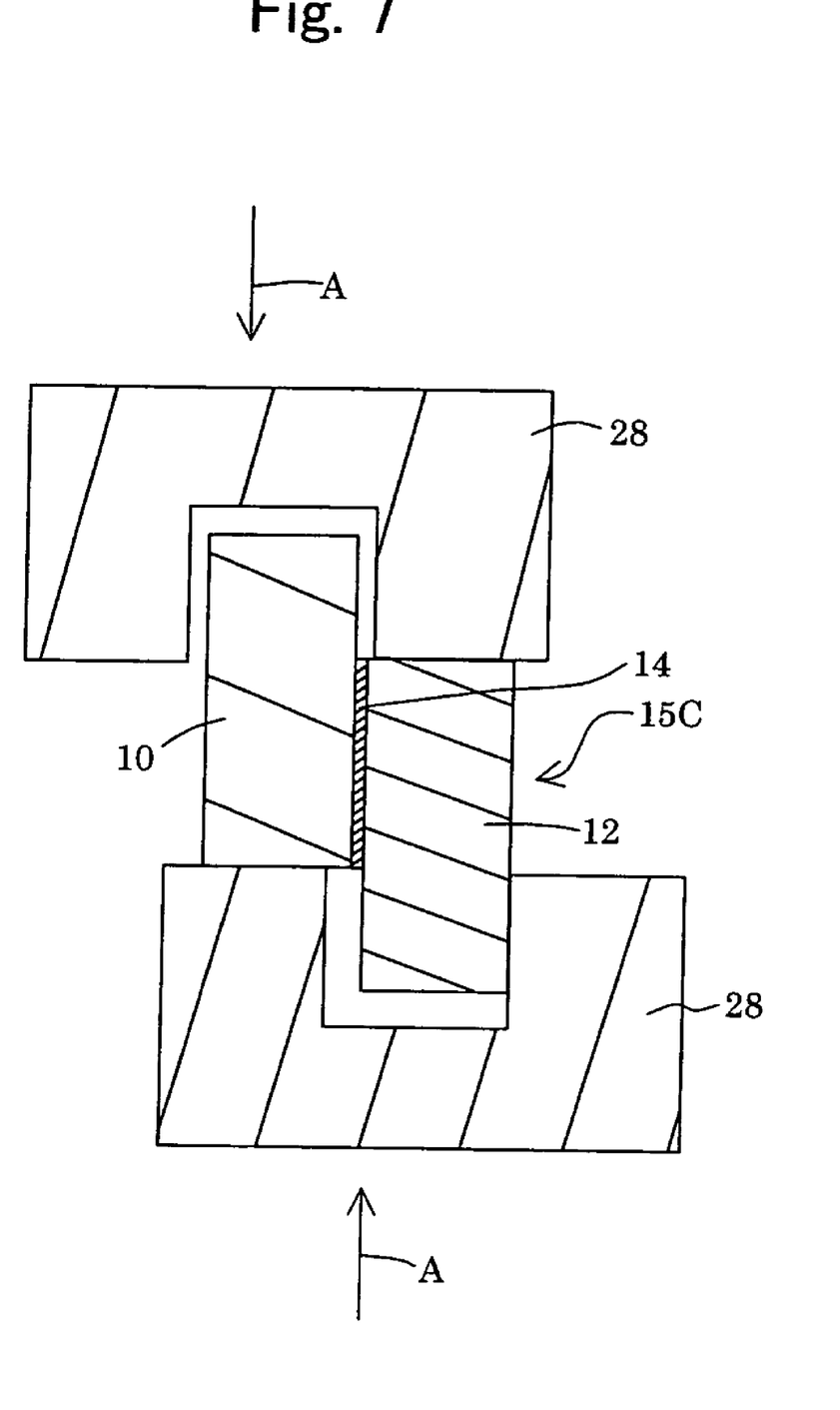
FIG. 7 is a diagram shows a joined article 15C and a method for testing its shear strength.

A joined article 15C as shown in FIG. 7 was produced according to the same procedure described in Experiment A. However, each of the first members 10 and second members 12 had a length of 25 mm, a width of 35 mm and a thickness of 10 mm. The indium foil 2 had a length of 25 mm, a width of 25 mm and a thickness of 0.2 mm. Each of the materials 1A and 1B for reducing the indium melting point had a length of 25 mm and width of 25 mm. The other conditions were the same as those applied in Experiment A to obtain the joined article 15C. The conditions are shown in Table 2.

The thus obtained article 15C was supported by a jig 28 shown in FIG. 7. A shear load was applied on each joined article 15C using an autograph as an arrow "A" in a direction parallel with the joining layer 17 at a speed of 0.5 mm/minute. The peeling strength was thus measured. The results were shown in Table 2.

TABLE 2

| Experiment | Material for Reducing Melting Point | Thickness (μm) | Joining condition Temperature ° C. | Pressure (atm) | Shear Strength (MPa) |
|---|---|---|---|---|---|
| B1 | Sn Sputtering | 3 | 135 | 14 | 1.5 |
| B2 | Sn foil | 15 | 135 | 14 | 2.1 |
| B3 | Sn foil | 30 | 135 | 14 | 1.8 |
| B4 | Ag Sputtering | 3 | 135 | 14 | 1.1 |
| B5 | Ag foil | 10 | 135 | 14 | 1.0 |
| B6 | Ag foil | 30 | 135 | 14 | 0.8 |
| B7 | None | — | 153 | 14 | 0.4 |
| B8 | Sn foil | 15 | 160 | 14 | 1.1 |
| B9 | Sn foil | 15 | 160 | 14 | 0.0 |

Experimental sample numbers B1 to B6 proved to have high shear strengths. In sample number B7, only the indium foil was used and heated at 153° C. The resulting joined body had a low shear strength of 0.4 MPa. The low strength is due to deteriorated adhesion along the joining interface. In experimental sample number B8, tin foils were used and heated at 160° C. higher than the melting point of indium. Although the resulting joined body had a high shear strength, indium leaked out of the gap of the joined members. In experimental sample number B9, a tin foil was used and heated at 100° C. As a result, the first and second members were successfully not joined with each other.

(Experiment C)

The joined body of FIG. 6(*a*) was produced according to the same procedure as described in Experiment A. However, the first member 10 had a disk shape having a diameter φ of 300 mm and a thickness of 20 mm. The second member 12 had a disk shape having a diameter φ of 300 mm and a thickness of 10 mm. The indium foil had a diameter of 300 mm and a thickness of 0.2 mm. The material for reducing the melting point of indium had a foil shape with a diameter of 300 mm and a thickness and composition as shown in Table 3. The thus obtained joined body was subjected to helium leakage measurement and an ultrasonic crack detection test.

TABLE 3

| Experiment | Material For Reducing Melting Point | Joining condition | | | Results | |
|---|---|---|---|---|---|---|
| | | Thickness (μm) | Temperature (° C.) | Pressure (atm) | Sealing Property | Ultrasonic Detection |
| C1 | Sn foil | 15 | 135 | 14 | OK | Excellent And Uniform Adhesion |
| C2 | Ag foil | 10 | 135 | 14 | OK | Excellent and Uniform Adhesion |
| C3 | None | — | 153 | 14 | OK | Poor adhesion Irregularities |
| C4 | Sn foil | 15 | 160 | 14 | NG | |
| C5 | Sn foil | 15 | 100 | 14 | NG | |

The resulting joined bodies of experimental sample numbers C1 and C2 proved to have excellent sealing properties and ultrasonic detection results. In experimental sample number C3, only the indium foil was used and heated at 153° C. Although the resulting joined body had an excellent sealing property, the adhesion along the joining interface was deteriorated. In experimental sample number C4, the tin foil was also used and heated at 160° C. higher than the melting point of an indium-tin alloy. The resulting joined body had a deteriorated sealing property. The reasons may be as follows. A pressure was applied on the heated and molten indium metal so that the molten indium flowed out of the gap between the first and second members. The amount of indium is thus insufficient in a part of the joining interface. Such a tendency may be more considerable as the joined area is increased as in the present example. In experimental sample number C5, the tin foil was also used and heated at 100° C. As a result, the first and second members were not successfully joined.

(Experiment "D")

The joined body shown in FIGS. 8(a) and (b) was produced according to the same procedure as described in the experiment A. However, a through hole 21A with a diameter of 3 mm was formed in the first member 10A. A step portion 10c with an outer diameter of 10 mm was formed in an opening on the side of the joining face 10b of the through hole 21A. Further, a through hole 21B having a diameter of 3 mm was formed in the second member 12. The indium foil and material for reducing the indium melting point were provided between the first and second members. An O-ring 23 with an outer diameter of 10 mm and inner diameter of 6 mm was set inside of the step portion 10c. The O-ring 23 directly contacted the pressurized face 10d of the first member 10A and joining face 12a of the second member 12, while contact between the O-ring 23 and the metal joining material was prevented. The inner space 30 of the O-ring 23 communicated with holes 21A and 21B. The joining process was performed as described in the experiment A. After the joining process, the space 30 and holes 21A and 21B were air-tightly sealed with the O-ring 23.

(Production Yield Test)

10 joined bodies 15B (see FIG. 6(b)) according to Experiment A were produced. The sealing property was evaluated as described above so that the production yield proved to be 80 percent.

Figure 8:
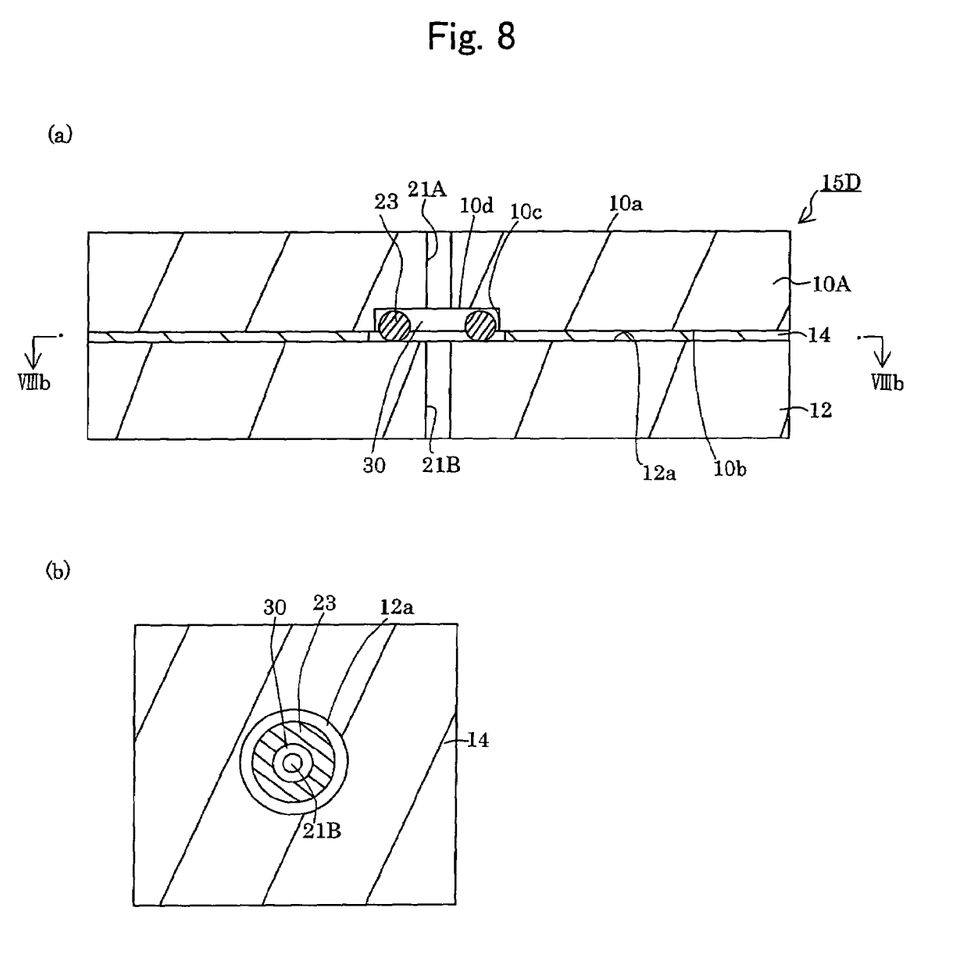

Contrary to this, 10 joined bodies 15D (see FIG. 8) according to Experiment D were produced. The sealing property was evaluated as described above so that the production yield was proved to be 100 percent. It is thus possible to further improve the yield of the body having the excellent sealing property along the joining interface, by providing an O-ring inside of the joining layer.

As described above, the present invention provides a process for joining a first member containing at least a ceramic and a second member containing at least a metal or a metal composite, so that the air-tightness of the joining portion may be improved, adhesive leakage is prevented and the adhesion along the interface of the adhesive layer and ceramics may be improved.

The present invention has been explained referring to the preferred embodiments, however, the present invention is not limited to the illustrated embodiments which are given by way of examples only, and may be carried out in various modes without departing from the scope of the invention.

The invention claimed is:

1. A method of producing a joined body including a first member comprising at least a ceramic and a second member comprising at least one of a metal and a metal composite, said method comprising the steps of:
   providing an indium-based metal adhesive comprising indium and tin wherein tin is present in an amount of no more than 10 wt %;
   placing said metal adhesive between said first and second members to provide a laminate; and
   heating said laminate at a temperature in a solid-liquid coexisting range of an alloy comprising indium and tin to join said first and second members.

2. The method of claim 1, wherein said laminate is heated at a temperature of not higher than 155° C.

3. The method of claim 1, further comprising a step of subjecting said laminate to isostatic pressing during said heating step.

4. The method of claim 3, further comprising the steps of:
   vacuum packaging said laminate to form a packaged laminated;
   disposing said packaged laminate in a sealed container filled with an inert gas; and
   subjecting said packaged laminate to isostatic pressing in said container with said inert gas.

5. The method of claim 3, further comprising a step of reducing the temperature of said laminate to room temperature after said heating step while continuing said isostatic pressing.

6. The method of claim 1, wherein said metal adhesive has a foil shape.

7. The method of claim 1, wherein said tin is provided between said indium and said first member.

8. The method of claim 1, wherein said tin has one of a foil shape and a film shape.

9. The method of claim 1, wherein said first member is a semiconductor wafer supporting member.

10. The method of claim 9, wherein said semiconductor wafer supporting member is an electrostatic chuck and said second member is a cooling flange.

11. The method of claim 1, further comprising the steps of:
- providing a first hole in said first member;
- providing a second hole in said second member; and
- providing an air-tight sealing member between said first hole and said adhesive and between said second hole and said adhesive when said first and second members are laminated so that said sealing member directly contacts said first and second members to provide secure sealing.

12. A joined body produced by the method of claim 1.

13. A joined body comprising:
- a first member comprising at least a ceramic semiconductor wafer supporting member;
- a second member comprising at least one of a metal and a metal composite; and
- an indium-based joining layer provided between said first and second members, said joining layer comprising indium and tin wherein tin is present in an amount of no more than 10 wt %.

14. The joined body of claim 13, wherein said semiconductor wafer supporting member is an electrostatic chuck and said second member is a cooling flange.

15. The joined body of claim 13, further comprising
- an air-tight sealing member;
- a first hole formed in said first member; and
- a second hole formed in said second member;
- wherein said sealing member is provided between said first hole and said joining layer and between said second hole and said joining layer, such that said sealing member directly contacts said first and second members.

* * * * *